United States Patent
Walker

[11] Patent Number: 6,114,006
[45] Date of Patent: Sep. 5, 2000

[54] HIGH THERMAL CONDUCTIVITY CARBON/CARBON HONEYCOMB STRUCTURE

[75] Inventor: Terence Bryan Walker, South Bend, Ind.

[73] Assignee: AlliedSignal Inc., Morristown, N.J.

[21] Appl. No.: 08/947,592

[22] Filed: Oct. 9, 1997

[51] Int. Cl.[7] .................................................. B32B 3/12
[52] U.S. Cl. ............................ 428/116; 428/118; 428/408
[58] Field of Search .................................... 428/116, 118, 428/73, 408

[56] References Cited

U.S. PATENT DOCUMENTS

| | | | |
|---|---|---|---|
| 4,086,378 | 4/1978 | Kam et al. | 428/116 |
| 4,399,052 | 8/1983 | Sugino | 428/408 |
| 4,518,704 | 5/1985 | Okabayashi et al. | 428/146 |
| 5,217,657 | 6/1993 | Engle | 264/29 |
| 5,283,099 | 2/1994 | Smith et al. | 428/116 |
| 5,288,537 | 2/1994 | Corden | 428/116 |
| 5,298,313 | 3/1994 | Noland | 428/229 |
| 5,360,669 | 11/1994 | Noland et al. | 428/408 |
| 5,389,325 | 2/1995 | Bookbinder et al. | 428/116 |
| 5,398,784 | 3/1995 | Haneda et al. | 188/218 |
| 5,415,715 | 5/1995 | Delage | 156/197 |
| 5,418,063 | 5/1995 | Booth | 428/408 |
| 5,451,444 | 9/1995 | De Liso et al. | 428/116 |
| 5,454,990 | 10/1995 | Chareire et al. | 264/29.5 |
| 5,466,507 | 11/1995 | Darfler | 428/116 |
| 5,470,633 | 11/1995 | Darfler | 428/118 |
| 5,514,445 | 5/1996 | Delage et al. | 428/116 |
| 5,527,584 | 6/1996 | Darfler et al. | 428/116 |
| 5,554,354 | 9/1996 | Sugino et al. | 428/307.3 |
| 5,556,704 | 9/1996 | Prevorsek et al. | 428/408 |
| 5,685,936 | 11/1997 | Komine et al. | 428/116 |
| 5,772,826 | 6/1998 | Lee et al. | 428/116 |
| 5,817,409 | 10/1998 | Stephan | 428/116 |
| 5,820,967 | 10/1998 | Gadkare | 428/116 |
| 5,888,608 | 3/1999 | Isai | 428/116 |

FOREIGN PATENT DOCUMENTS

| | | | |
|---|---|---|---|
| 0 339 606 | 11/1989 | European Pat. Off. | C04B 35/52 |
| 4053736 | 2/1992 | Japan | B32B 3/12 |
| 810491 | 3/1959 | United Kingdom . | |

OTHER PUBLICATIONS

International Search Report PCT/US 98/21428.
"The Flight of Voyager"; The Washington Post, p. A6 / Dec. 24, 1986 *Class 428–408C*.

*Primary Examiner*—Margaret Medley
*Attorney, Agent, or Firm*—Larry J. Palguta

[57] ABSTRACT

The invention provides a method for producing carbon/carbon composite honeycomb structures which have not only the mechanical properties associated with carbon/carbon materials but high thermal conductivities (>200 w/m-k) as well. A honeycomb structure comprising a low-modulus pitch precursor carbon fiber composite is heated or carbonized to drive off volitiles, densified at low pressure by CVD/CVI to provide a graphitizable carbon matrix, and then heat treated to graphitize both the carbon fiber and the carbon matrix. The resulting honeycomb structure has a high thermal conductivity with an increased fiber modulus and may be used, for example, for making heat transfer devices.

9 Claims, No Drawings

HIGH THERMAL CONDUCTIVITY CARBON/CARBON HONEYCOMB STRUCTURE

The present invention relates generally to a method for producing carbon/carbon composite honeycomb structures, and in particular carbon/carbon composite honeycomb structures having high thermal conductivity usable for heat transfer devices.

"Honeycomb" as used herein should include any and all cellular, thin walled structural materials of regular construction. Honeycomb structural materials are used in numerous applications where high stiffness to weight ratios are required. A wide variety of materials are used to produce honeycomb structures including numerous metals (e.g. aluminum, titanium, and stainless steels) and a wide variety of organic matrix composites. Many honeycomb applications (e.g. engine cowlings) require heat resistance and in some cases require both heat resistance and a certain level of thermal conductivity. A persistent problem in design of these structures has been to optimize both high temperature mechanical properties and thermal conductivity, while at the same time minimizing weight. At present, the "best" solutions available have resulted in compromises in one or more of the desirable parameters. For example, aluminum is easily made into honeycomb, and has excellent specific thermal conductivity. However, aluminum's mechanical properties deteriorate at relatively low temperatures. Stainless steel, while retaining good mechanical properties at elevated temperatures, has poor specific thermal conductivity. Titanium is difficult and expensive to fabricate and also has inferior specific thermal conductivity when compared to aluminum. Organic matrix composite honeycomb materials with relatively high specific thermal conductivity have been developed using high modulus, pitch precursor carbon fibers and various organic matrices including epoxies and cyanate esters (see Corden U.S. Pat. No. 5,288,537 and Darfler et al. U.S. Pat. No. 5,527,584.) These structures have limited temperature ranges as the mechanical properties are limited by the relatively poor properties of the matrix materials. Additionally, the high modulus carbon fibers used are very expensive and difficult to process because of their high stiffness. Carbon/carbon honeycomb structures have been described previously in Delage et al., U.S. Pat. Nos. 5,415,715 and 5,514,445. These structures have the advantages of high specific strength and stiffness associated with carbon/carbon composites. Additionally, they retain these properties at high temperatures. It is highly desirable to provide a process whereby low-cost, low-modulus carbon fibers can be used to make honeycomb materials which can be subsequently densified and converted to highly thermally conductive materials, with an accompanying increase in fiber modulus. Such materials could be used in heat exchangers or other heat transfer devices. They could be of particular value in applications where aluminum is unacceptable due to its poor high temperature strength or where metals with better high temperature properties (e.g. titanium) are unacceptable due to weight restrictions or have inadequate thermal conductivity.

The present invention provides solutions to the above by disclosing a process of providing a high thermal conductivity honeycomb structure made from a low-modulus pitch precursor carbon fiber composite and a graphitic carbon matrix, comprising the steps of providing a low-modulus pitch precursor carbon fiber composite structure, heating the low-modulus pitch precursor carbon fiber composite structure to a temperature in the range of approximately 700–900° C., densifying the composite structure with graphitizable carbon by means of CVD/CVI at a low pressure and a temperature range of approximately 950–1200° C., and heat treating the structure to a temperature of approximately 2200–3200° C. to provide the honeycomb structure from low-modulus pitch precursor carbon fiber composite and graphitic carbon matrix whereby the honeycomb structure has high thermal conductivity and an increased fiber modulus.

Low modulus, pitch precursor carbon fibers (e.g. P-25 or P-30X, Amoco Performance Products; MKC 321, Mitsubishi), are used in conjunction with phenolic or epoxy novalac resins or other carbonizable thermoset resins to produce honeycomb structures using conventional honeycomb production techniques. Because these fibers are of relatively low modulus, production of small cell size honeycomb is easier than with high modulus fibers. Such honeycomb structures can be obtained, for example, from YLA Cellular Products Company, Dublin, Calif. These structures are then converted to carbon/carbon composites via inert gas pyrolysis and carbonization. Typical carbonization temperatures are approximately 700–900° C. The matrix material becomes porous during the carbonization process due to loss of non-carbon materials from the resin. The resulting structure is then densified using carbon vapor deposition/carbon vapor infiltration ("CVD/CVI") processes which, given correct processing conditions, deposit highly graphitizable carbon. These processes typically use natural gas or mixtures of low molecular weight hydrocarbon gases at low pressure (<approximately 100 torr) and operate at temperatures of approximately 950° C. to 1200° C. Precursor gases are "cracked" to yield solid carbon and hydrogen as well as numerous by-products. The solid carbon deposits within the pores of the carbonized honeycomb. The resulting densified structure (typical density 1.8 g/cc) is then heat treated to between approximately 2200 and 3200° C. to graphitize both the carbon fiber and the carbon matrix. Optionally, heat treating may also occur before densification if the possibility of distortion of the structure is to be eliminated. The resulting structure has an increase in fiber modulus and exhibits high thermal conductivities of greater than approximately 200 w/m-k in the so-called fiber directions which are in the directions of the planes of the honeycomb walls. Conductivity through cell walls is predicted to be lower.

EXAMPLE

Carbon fiber phenolic composite honeycomb material was produced using 25 million psi modulus pitch precursor carbon fiber and commercially available phenolic resin such as SC1008 from Borden Industrial Resins. Standard honeycomb manufacturing practices were used. The material was pyrolyzed, using inert gas pyrolysis to approximately 800° C. CVD densification was used to densify the material to a density of 1.7–1.75 g/cc. The material was then heat treated to above 2200° C., using a peak temperature soak time >2 hr. Flat witness specimens from the same materials, made using the same process, had measured thermal conductivities >200 w/m-k in the fiber directions.

The present invention enables the use of an existing low modulus fiber structure to provide a high thermal conductivity fiber based honeycomb structure. This avoids the use of costly high modulus fiber material structures or the processing of low modulus fibers to make composite materials that are then used to make a honeycomb shaped structure.

I claim:

1. A process of providing a high thermal conductivity honeycomb structure made from a low-modulus pitch precursor carbon fiber composite comprising initially a composite of low-modulus pitch precursor carbon fibers and a carbonizable thermoset resin, and a graphitic carbon matrix, comprising the steps of providing a low-modulus pitch precursor carbon fiber composite, heating the low-modulus pitch precursor carbon fiber composite to a temperature in the range of approximately 700–900° C., and subsequently heat treating the composite to a temperature between approximately 2200–3200° C., densifying the composite with graphitizable carbon by means of CVD/CVI at a low pressure and a temperature range of approximately 950–1200° C., and heat treating the structure to a temperature between approximately 2200–7200° C. to provide the honeycomb structure made from low-modulus pitch precursor carbon fiber composite and graphitic carbon matrix whereby the honeycomb structure has high thermal conductivity and an increased fiber modulus.

2. The process in accordance with claim 1, wherein the low pressure is less than approximately 100 torr.

3. The process in accordance with claim 1, wherein the low-modulus pitch precursor carbon fiber has initially a modulus of less than 70 million psi.

4. The process in accordance with claim 1, wherein the thermoset resin comprises one of a phenolic resin and epoxy novalac resin.

5. The process in accordance with claim 1, wherein the high thermal conductivity is greater than approximately 200 w/m-k in directions of the planes of honeycomb walls.

6. A high thermal conductivity honeycomb structure made from a low-modulus pitch precursor carbon fiber composite comprising initially a composite of low-modulus pitch precursor carbon fibers and a carbonizable thermoset resin, and a graphitic carbon matrix, the low-modulus pitch precursor carbon fiber composite having been heated to a temperature in the range of approximately 700–900° C., and subsequently between heat treated a temperature of approximately 2200–3200° C., densified with graphitizable carbon by means of CVD/CVI at a low pressure and a temperature range of approximately 950–1200° C., and subsequently heat treated between a temperature of approximately 2200–3200° C., the high thermal conductivity honeycomb structure made from the low-modulus pitch precursor carbon fiber composite and graphitic carbon matrix having a thermal conductivity of greater than approximately 200 w/m-k in a through-thickness direction, an increased fiber modulus, and a higher proportion of aligned graphitic carbon in the matrix.

7. The structure in accordance with claim 6, wherein the low pressure is less than approximately 100 torr.

8. The structure in accordance with claim 6, wherein the low-modulus pitch precursor carbon fiber has initially a modulus of less than 70 million psi.

9. The structure in accordance with claim 6, wherein the thermoset resin comprises one of a phenolic resin and epoxy novalac resin.

* * * * *